J. M. KENT.
Fruit Gatherer.
No. 233,771. Patented Oct. 26, 1880.
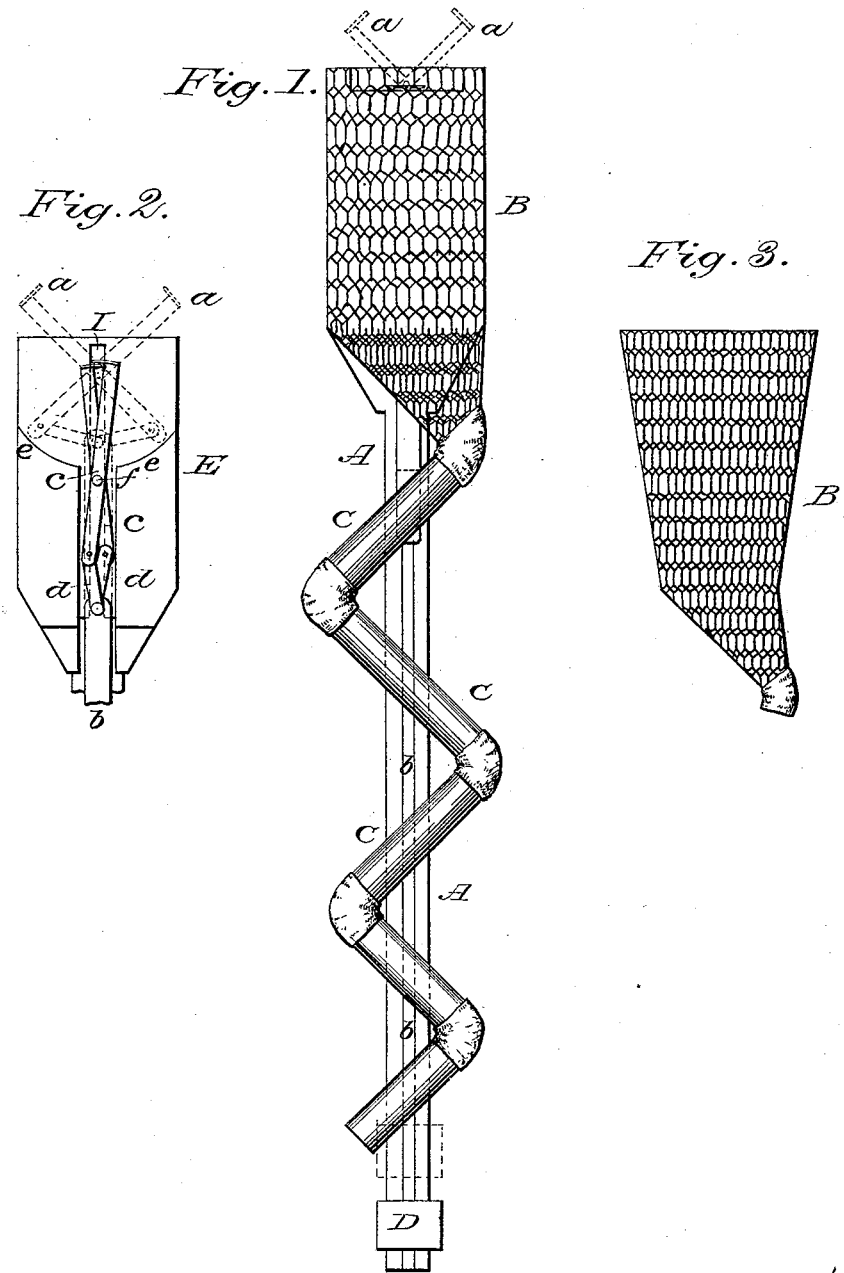

UNITED STATES PATENT OFFICE.

JAMES M. KENT, OF MONTPELIER, VERMONT.

FRUIT-GATHERER.

SPECIFICATION forming part of Letters Patent No. 233,771, dated October 26, 1880.

Application filed November 6, 1879.

*To all whom it may concern:*

Be it known that I, JAS. M. KENT, of Montpelier, in the county of Washington and State of Vermont, have invented certain new and useful Improvements in Fruit-Gatherers; and I do hereby declare that the following is a full, clear, and exact description thereof, reference being had to the accompanying drawings, and to the letters of reference marked thereon, making a part of this specification.

The object of my invention is to provide an implement for picking fruit from a tree without cutting or injuring the boughs and conducting the fruit carefully to the ground by means of a tube, as hereinafter described.

In the annexed drawings, Figure 1 represents a side elevation of my invention; Fig. 2, a detached view of the head with the cup removed, and Fig. 3 a detached view of a modified form of receiving-cup.

A represents the pole; B, the receiving-cup attached to the upper end of the pole. C C represent the conducting-tube attached to the bottom of the receiving-cup B, extending downward along pole A, to which it is also attached. It is constructed of short oppositely-inclined sections, the sections growing gradually shorter as they descend, forming short angles or curves, which retard the downward course of the fruit in the tube.

Along the pole A is formed a groove, containing the movable rod $b$, which operates the picking device, as hereinafter described.

E is a head-piece, secured to the top of the pole A, and having a recess at its upper end upon one side, so as to form inclines or inclined ways $e$ $e$, which serve as guides for the lower ends of levers $c$ $c$, which slide upon said inclined ways. A slot, I, is formed in the upper end of the head E, and extends from a point just below the inclines $e$ to near the top of the head.

To the upper end of the rod $b$ are pivoted the lower ends of the two connecting-links $d$ $d$, whose upper ends are pivoted to the levers $c$ $c$, to which pickers $a$ $a$ are attached. The levers $c$ $c$ are pivoted together near their centers by a rivet, $f$, which extends through said levers into slot I.

In operating my device the cup is raised to the required position for gathering by means of the pole A, which may rest in the hands or in a loop for that purpose in a band around the operator's waist. The pickers $a$ $a$ are raised above cup B and thrown open by an upward movement of rod $b$ by the hand at D. The pickers $a$ $a$ remain closed in their upward movement until they rise above the top of cup B, and until the rivet $f$ reaches the upper end of slot I, when the continued upward pressure on the connecting-links $d$ $d$ forces levers $c$ $c$ apart into the recessed portion of head E, at the same instant throwing open the pickers $a$ $a$ in readiness to grasp the fruit. When the pickers $a$ $a$ are in position to pick the fruit they are closed by a downward movement of rod $b$ by the hand at D, which brings the lower ends of levers $c$ $c$ in contact with the inclines $e$ $e$ in head E, which forces them together, causing the pickers to close. The downward motion continued causes the pickers $a$ $a$ to descend into cup B with the fruit. The limb is supported by the rim of cup B while the pickers pull off the fruit, which drops into cup B and descends slowly through the conducting-tube C.

It will be seen that one movement upward of the hand at D produces two movements of the pickers $a$ $a$—first, their upward movement; second, their expansion to receive the fruit. Likewise one movement downward of the hand at D produces two movements of the pickers —first, it closes them; second, they descend into cup B with the fruit.

Having fully described my invention, what I desire to claim, and secure by Letters Patent, is—

1. In a fruit-gatherer, the conducting-tube C, formed of oppositely-inclined sections decreasing in length downward, as shown, to form a zigzag way for the fruit, as described.

2. The combination, with pole A, cup B, and conducting-tube C, of the recessed head E, having slot I and inclines $e$ $e$, the levers $c$ $c$, with pickers $a$ $a$, and rivet $f$, working in said slot, the connecting-links $d$ $d$, and rod $b$, as and for the purpose described.

In testimony that I claim the foregoing I have hereunto set my hand and seal this 19th day of August, 1879.

JAMES MADISON KENT. [L. S.]

Witnesses:
THOMAS J. DEAVITT,
JOHN GAVEGAN.